US006532433B2

(12) United States Patent
Bharadwaj et al.

(10) Patent No.: US 6,532,433 B2
(45) **Date of Patent: *Mar. 11, 2003**

(54) METHOD AND APPARATUS FOR CONTINUOUS PREDICTION, MONITORING AND CONTROL OF COMPRESSOR HEALTH VIA DETECTION OF PRECURSORS TO ROTATING STALL AND SURGE

(75) Inventors: Sanjay Bharadwaj, Bangalore (IN); Narayanan Venkateswaran, Bangalore (IN); Chung-hei Simon Yeung, Evansville, IL (US); Steven Mark Schirle, Anderson, SC (US); Johnalagadda Venkata Rama Prasad, Roswell, GA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,826

(22) Filed: Apr. 17, 2001

(65) Prior Publication Data

US 2002/0161550 A1 Oct. 31, 2002

(51) Int. Cl.[7] ................................................ G06F 19/00
(52) U.S. Cl. ........................ 702/182; 89/41.03; 416/26; 701/100
(58) Field of Search .......................... 702/127, 81, 182; 700/174–178, 301; 701/100; 60/794; 89/41.03; 416/26; 415/57.4; 703/7, 8

(56) References Cited

U.S. PATENT DOCUMENTS

| | | | | |
|---|---|---|---|---|
| 5,309,379 A | | 5/1994 | Rawlings et al. | 703/8 |
| 5,413,029 A | * | 5/1995 | Gent et al. | 89/41.03 |
| 5,448,881 A | * | 9/1995 | Patterson et al. | 60/794 |
| 5,594,665 A | * | 1/1997 | Walter et al. | 700/301 |
| 6,208,953 B1 | | 3/2001 | Milek et al. | 703/7 |
| 6,231,301 B1 | | 5/2001 | Barnett et al. | 415/57.4 |
| 6,231,306 B1 | | 5/2001 | Khalid | 416/26 |
| 6,438,484 B1 | * | 8/2002 | Andrew et al. | 701/100 |

FOREIGN PATENT DOCUMENTS

| | | |
|---|---|---|
| EP | 0 412 795 A2 | 2/1991 |
| EP | 0 516 534 A1 | 2/1992 |
| EP | 0 315 307 A2 | 9/1998 |

* cited by examiner

*Primary Examiner*—John Barlow
*Assistant Examiner*—John Le
(74) *Attorney, Agent, or Firm*—Nixon & Vanderhye P.C.

(57) ABSTRACT

An apparatus for monitoring the health of a compressor having at least one sensor operatively coupled to the compressor for monitoring at least one compressor parameter, a processor system embodying a stall precursor detection algorithm, the processor system operatively coupled to the at least one sensor, the processor system computing stall precursors. A comparator is provided to compare the stall precursors with predetermined baseline data, and a controller operatively coupled to the comparator initiates corrective actions to prevent a compressor surge and stall if the stall precursors deviate from the baseline data, the baseline data representing predetermined level of compressor operability.

24 Claims, 6 Drawing Sheets

METHOD AND APPARATUS FOR CONTINUOUS PREDICTION, MONITORING AND CONTROL OF COMPRESSOR HEALTH VIA DETECTION OF PRECURSORS TO ROTATING STALL AND SURGE

BACKGROUND OF THE INVENTION

This invention relates to non-intrusive techniques for monitoring the health of rotating mechanical components. More particularly, the present invention relates to a method and apparatus for pro-actively monitoring the health and performance of a compressor by detecting precursors to rotating stall and surge.

The global market for efficient power generation equipment has been expanding at a rapid rate since the mid-1980's—this trend is projected to continue in the future. The Gas Turbine Combined-Cycle power plant, consisting of a Gas-Turbine based topping cycle and a Rankine-based bottoming cycle, continues to be the customer's preferred choice in power generation. This may be due to the relatively-low plant investment cost, and to the continuously-improving operating efficiency of the Gas Turbine based combined cycle, which combine to minimize the cost of electricity production.

In gas turbines used for power generation, a compressor must be allowed to operate at a higher pressure ratio in order to achieve a higher machine efficiency. During operation of a gas turbine, there may occur a phenomenon known as compressor stall, wherein the pressure ratio of the turbine compressor initially exceeds some critical value at a given speed, resulting in a subsequent reduction of compressor pressure ratio and airflow delivered to the engine combustor. Compressor stall may result from a variety of reasons, such as when the engine is accelerated too rapidly, or when the inlet profile of air pressure or temperature becomes unduly distorted during normal operation of the engine. Compressor damage due to the ingestion of foreign objects or a malfunction of a portion of the engine control system may also result in a compressor stall and subsequent compressor degradation. If compressor stall remains undetected and permitted to continue, the combustor temperatures and the vibratory stresses induced in the compressor may become sufficiently high to cause damage to the turbine.

It is well known that elevated firing temperatures enable increases in combined cycle efficiency and specific power. It is further known that, for a given firing temperature, an optimal cycle pressure ratio is identified which maximizes combined-cycle efficiency. This optimal cycle pressure ratio is theoretically shown to increase with increasing firing temperature. Axial flow compressors are thus subjected to demands for ever-increasing levels of pressure ratio, with the simultaneous goals of minimal parts count, operational simplicity, and low overall cost. Further, an axial flow compressor is expected to operate at a heightened level of cycle pressure ratio at a compression efficiency that augments the overall cycle efficiency. The axial compressor is also expected to perform in an aerodynamically and aero-mechanically stable manner over a wide range in mass flow rate associated with the varying power output characteristics of the combined cycle operation.

The general requirement which led to the present invention was the market need for industrial Gas Turbines of improved combined-cycle efficiency and based on proven technologies for high reliability and availability.

One approach monitors the health of a compressor by measuring the air flow and pressure rise through the compressor. A range of values for the pressure rise is selected a-priori, beyond which the compressor operation is deemed unhealthy and the machine is shut down. Such pressure variations may be attributed to a number of causes such as, for example, unstable combustion, rotating stall and surge events on the compressor itself. To determine these events, the magnitude and rate of change of pressure rise through the compressor are monitored. When such an event occurs, the magnitude of the pressure rise may drop sharply, and an algorithm monitoring the magnitude and its rate of change may acknowledge the event. This approach, however, does not offer prediction capabilities of rotating stall or surge, and fails to offer information to a real-time control system with sufficient lead time to proactively deal with such events.

BRIEF SUMMARY OF THE INVENTION

Accordingly, the present invention solves the simultaneous need for high cycle pressure ratio commensurate with high efficiency and ample surge margin throughout the operating range of a compressor. More particularly, the present invention is directed to a system and method for pro-actively monitoring and controlling the health of a compressor using stall precursors, the stall precursors being generated by a Kalman filter. In the exemplary embodiment, at least one sensor is disposed about the compressor for measuring the dynamic compressor parameters, such as for example, pressure and velocity of gases flowing through the compressor, force and vibrations on compressor casing, etc. Monitored sensor data is filtered and stored. Upon collecting and digitizing a pre-specified amount of data by the sensors, a time-series analysis is performed on the monitored data to obtain dynamic model parameters.

The Kalman filter combines the dynamic model parameters with newly monitored sensor data and computes a filtered estimate. The Kalman filter updates its filtered estimate of a subsequent data sample based on the most recent data sample. The difference between the monitored data and the filtered estimate, known as "innovations" is compared, and a standard deviation of innovations is computed upon making a predetermined number of comparisons. The magnitude of the standard deviation is compared to that of a known correlation for the baseline compressor, the difference being used to estimate a degraded compressor operating map. A corresponding compressor operability measure is computed and compared to a design target. If the operability of the compressor is deemed insufficient, corrective actions are initiated by the real-time control system to pro-actively anticipate and mitigate any potential rotating stall and surge events thereby maintaining a required compressor operability level.

Some of the corrective actions may include varying the operating line control parameters such as, for example, making adjustments to compressor variable vanes, inlet air heat, compressor air bleed, combustor fuel mix, etc. in order to operate the compressor at a near threshold level. Preferably, the corrective actions are initiated prior to the occurrence of a compressor surge event and within a margin identified between an operating line threshold value and the occurrence of a compressor surge event. These corrective steps are iterated until the desired level of compressor operability is achieved.

A Kalman filter contains a dynamic model of system errors, characterized as a set of first order linear differential equations. Thus, the Kalman filter comprises equations in which the variables (state-variables) correspond to respective error sources—the equations express the dynamic relationship between these error sources. Weighting factors are applied to take account of the relative contributions of the errors. The weighting factors are optimized at values depending on the calculated simultaneous minimum variance in the distributions of errors. The Kalman filter constantly reassesses the values of the state-variables as it receives new measured values, simultaneously taking all past measurements into account, thus capable of predicting a value of one or more chosen parameters based on a set of state-variables which are updated recursively from the respective inputs.

In another embodiment of the present invention, a temporal Fast Fourier Transform (FFT) for computing stall measures.

In yet another embodiment, the present invention provides a correlation integral technique in a statistical process context may be used to compute stall measures.

In further another embodiment, the present invention provides an auto-regression (AR) model augmented by a second order Gauss-Markov process to estimate stall measures.

According to one aspect, the invention provides a method for pro-actively monitoring and controlling a compressor, comprising: (a) monitoring at least one compressor parameter; (b) analyzing the monitored parameter to obtain time-series data; (c) processing the time-series data using a Kalman filter to determine stall precursors; (d) comparing the stall precursors with predetermined baseline values to identify compressor degradation; (e) performing corrective actions to mitigate compressor degradation to maintain a pre-selected level of compressor operability; and (f) iterating said corrective action performing step until the monitored compressor parameter lies within predetermined threshold. Step (c) of the method further comprises i) processing the time-series data to compute dynamic model parameters; and ii) combining, in the Kalman filter, the dynamic model parameters and a new measurement of the compressor parameter to produce a filtered estimate, iii) computing a standard deviation of difference between the filtered estimate and the new measurement to produce stall precursors. Corrective actions are preferably initiated by varying operating line parameters. The corrective actions include reducing the loading on the compressor. Preferably, the operating line parameters are set to a near threshold value.

In another aspect, the present invention provides an apparatus for monitoring the health of a compressor, the apparatus comprises at least one sensor operatively coupled to the compressor for monitoring at least one compressor parameter; a processor system, embodying a Kalman filter, operatively coupled to the at least one sensor, the processor system computing stall precursors; a comparator that compares the stall precursors with predetermined baseline data; and a controller operatively coupled to the comparator, the controller initiating corrective actions to prevent a compressor surge and stall if the stall precursors deviate from the baseline data, the baseline data representing predetermined level of compressor operability. The apparatus further comprises an analog-to-digital (A/D) converter operatively coupled to the at least one sensor for sampling and digitizing input data from the at least one sensor; a calibration system coupled to the A/D converter, the calibration system performing time-series analysis (t,x) on the monitored parameter to compute dynamic model parameters; and a look-up-table (LUT) with memory for storing known sets of compressor data including corresponding stall measure data.

In yet another aspect, the present invention provides a gas turbine of the type having a compressor, a combustor, a method for monitoring the health of a compressor is performed according to various embodiments of the invention.

In yet another aspect, the present invention provides an apparatus for monitoring and controlling the health of a compressor having means for measuring at least one compressor parameter; means for computing stall measures; means for comparing the stall measures with predetermined baseline values; and means for initiating corrective actions if the stall measures deviate from the baseline values. In one embodiment, the means for computing stall measures embodies a Kalman filter. In another embodiment, the means for computing stall measures embodies a Fast Fourier Transform (FFT) algorithm. In yet another embodiment, the means for measuring computing stall measures is a correlation integral algorithm.

In yet another embodiment, the present invention provides a method for monitoring and controlling the health of a compressor by providing a means for measuring at least one compressor parameter; providing a means for computing stall measures; providing a means for comparing the stall measures with predetermined baseline values; and providing a means for initiating corrective actions if the stall measures deviate from the baseline values.

In further another embodiment, an apparatus for monitoring the health of a compressor, comprising at least one sensor operatively coupled to the compressor for monitoring at least one compressor parameter; a processor system, embodying a stall precursor detection algorithm, operatively coupled to the at least one sensor, the processor system computing stall precursors; a comparator that compares the stall precursors with predetermined baseline data; and a controller operatively coupled to the comparator, the controller initiating corrective actions to prevent a compressor surge and stall if the stall precursors deviate from the baseline data, the baseline data representing predetermined level of compressor operability. In one embodiment, the stall precursor detection algorithm is a Kalman filter. In another embodiment, the stall precursor detection algorithm is a temporal Fast Fourier Transform. In yet another embodiment, the stall precursor detection algorithm is a correlation integral. In a further embodiment, the stall precursor detection algorithm includes an auto-regression (AR) model augmented by a second order Gauss-Markov process.

In yet another aspect, the present invention provides a method of detecting precursors to rotating stall and surge in a compressor, the method comprising measuring the pressure and velocity of gases flowing through the compressor and using a Kalman filter in combination with offline calibration computations to predict future precursors to rotating stall and surge, wherein the Kalman filter utilizes a definition of errors and their stochastic behavior in time; the relationship between the errors and the measured pressure and velocity values; and how the errors influence the prediction of precursors to rotating stall and surge.

The benefits of the present invention will become apparent to those skilled in the art from the following detailed description, wherein only the preferred embodiment of the invention is shown and described, simply by way of illustration of the best mode contemplated of carrying out the invention.

DETAILED DESCRIPTION OF THE INVENTION

Figure 1:
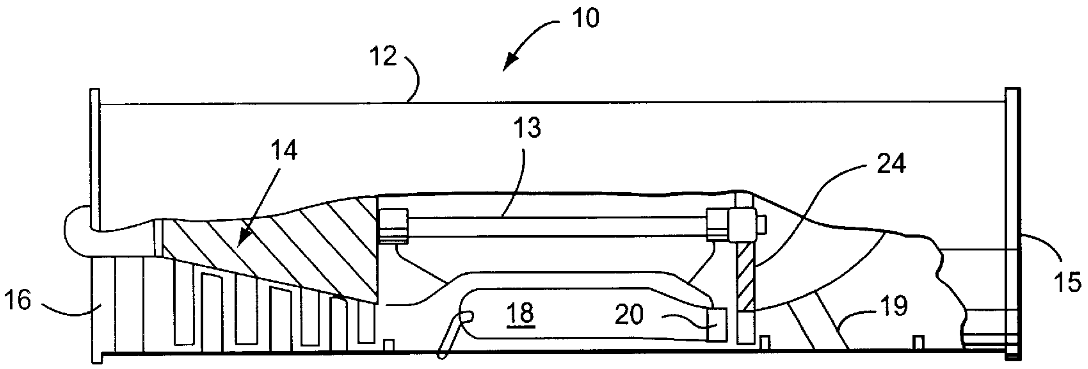
FIG. 1 is a schematic representation of a typical gas turbine engine.

Referring now to FIG. 1, a gas turbine engine is shown at 10 as comprising a housing 12 having a compressor 14, which may be of the axial flow type, within the housing adjacent to its forward end. The compressor 14 receives air through an annular air inlet 16 and delivers compressed air to a combustion chamber 18. Within the combustion chamber 18, air is burned with fuel and the resulting combustion gases are directed by a nozzle or guide vane structure 20 to the rotor blades 22 of a turbine rotor 24 for driving the rotor. A shaft 13 drivably connects the turbine rotor 24 with the compressor 14. From the turbine blades 22, the exhaust gases discharge rearwardly through an exhaust duct 19 into the surrounding atmosphere.

Figure 2:
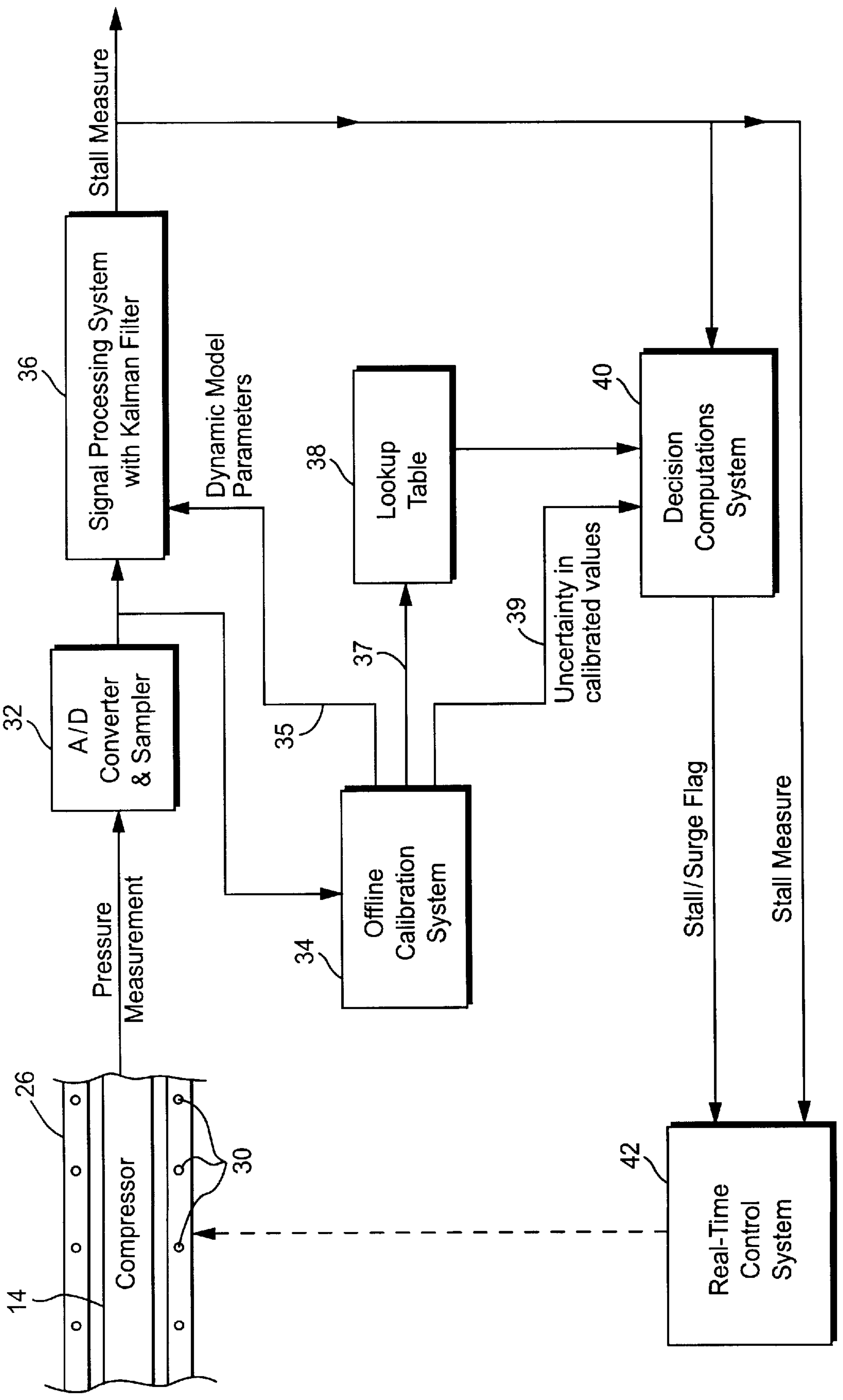
FIG. 2 illustrates a schematic representation of a compressor control operation and detection of precursors to rotating stall and surge using a Kalman filter.

Referring now to FIG. 2, there is shown an exemplary schematic view of the present invention in block diagram fashion. In this exemplary embodiment, a single stage of the compressor is illustrated. In fact, a compressor may includes several of such stages. Here, sensors 30 are disposed about a 26 casing of compressor 14 for measuring the dynamic compressor parameters such as, for example, pressure, velocity of gases flowing through compressor 14, force, vibrations exerted on the compressor casing, etc. Dynamic pressure is considered as an exemplary parameter for the detailed explanation of the present invention. It will be appreciated that other compressor parameters, as noted above, may be monitored to estimate the health of compressor 14. The pressure data from sensors 30 is digitized and sampled in an A/D converter 32. The digitized signals from A/D converter 32 are received by a Kalman Filter 36 and an offline calibration system 34. When a predetermined amount of data is collected during normal operation of compressor 14, time-series analysis of the data is performed by the calibration system 34 to produce dynamic model parameters while compensating for the sensor drift over time. The dynamic model parameters are received by the Kalman Filter 36 which combines the dynamic model parameters and new pressure data digitized by A/D converter 32 to produce a filtered estimate. The difference between the measured data and the filtered estimate, hereinafter referred to as "innovations", is further processed to identify stall precursors.

A look-up-table 38 is constructed and populated with stall measure values as a function of speed (rpm), angle of inlet guide vanes (IGVs), and compressor stage. The values populated in the LUT 38 are known values against which the measured sensor data processed by the offline calibration unit 34 is compared to determine stall precursors, i.e., LUT 38 identifies the state at which the stall measure of compressor 14 is supposed to be. Upon collecting a predetermined number of innovations, a standard deviation of the "innovations" is computed. The magnitude of the standard deviation of "innovations" is compared with known correlation for the baseline compressor in a decision computations system 40. The decision computations system 40 identifies if the stall measure from Kalman filter 36 deviates from the baseline values received in decision system 40. The presence/absence of a stall or surge is indicated by a "1/0" to identify whether compressor 14 is healthy or not. The stall measure computed by the Kalman Filter 36, however, is a continuously varying signal for causing the control system 42 to initiate mitigating actions in the event of identifying a stall or surge. The mitigating actions may be initiated by varying the operating line parameters of compressor 14. A magnitude of the standard deviation of innovations offers information to control system 42 with sufficient lead time for appropriate actions by control system 42 to mitigate risks if the compressor operation is deemed unhealthy.

The difference between measured precursor magnitude(s) and the baseline stall measure via existing transfer functions is used to estimate a degraded compressor operating map, and a corresponding compressor operability measure, i.e., operating stall margin is computed and compared with a design target. The operability of the compressor of interest is then deemed sufficient or not. If the compressor operability is deemed insufficient, then a need for providing active controls is made and the instructions are passed to control system 32 for actively controlling compressor 14.

Figure 3:
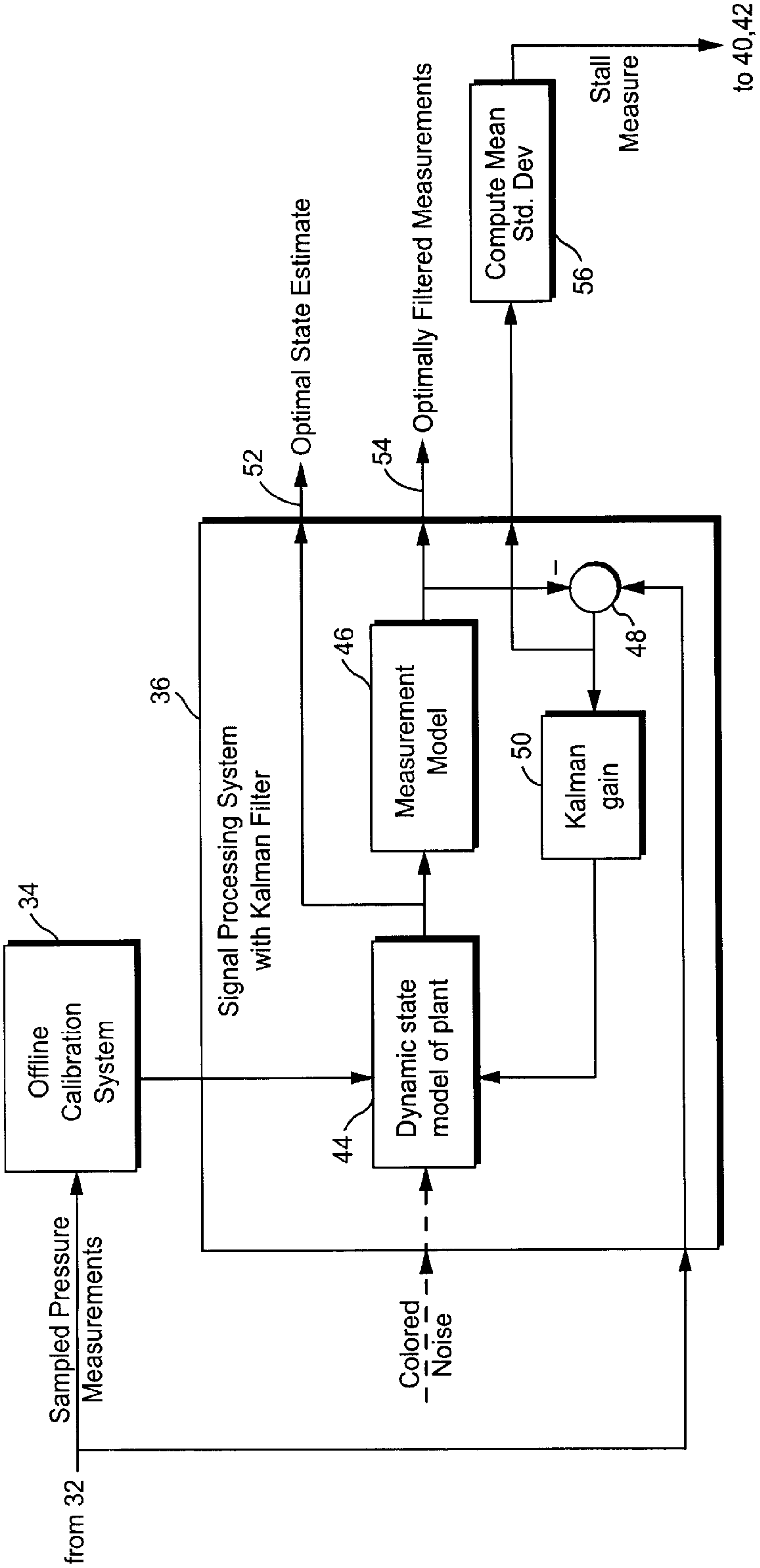
FIG. 3 illustrates the details of a Kalman filter as shown in FIG. 2.

Referring now to FIG. 3, there is shown a schematic of a Kalman filter indicated at 36. Here, sampled pressure data from A/D converter 32 is fed to a dynamic state model of plant as indicated at 44. The dynamic state model 44 is used to infer data (for example, stall precursor data in the present embodiment) from the measured pressure data. Output signals of the dynamic state model 44 are received by the measurement model 46 which calibrates the signals to offset noise from sensors 30 (FIG. 2). The calibrated output signals from the measurement model 46 are fed to monitor the Kalman gain indicated at 50 in order to ensure that the filtered estimates from Kalman filter 36 are within the range of sensor measurements. The output signals from comparator 48 are also received by unit 56 for computing standard deviation which is indicative of a stall measure. The stall measure is fed to decision computations unit 40 and control system 42 (FIG. 2).

Comparison of measured pressure data with baseline compressor values indicates the operability of the compressor. This compressor operability data may be used to initiate the desired control system corrective actions to prevent a compressor surge, thus allowing the compressor to operate with a higher efficiency than if additional margin were required to avoid near stall operation. Stall precursor signals indicative of onset of compressor stall may also be provided, as illustrated in FIG. 4, to a display 45 or other indicator means so that an operator may manually initiate corrective measures to prevent a compressor surge and avoid near stall operation.

Figure 4:
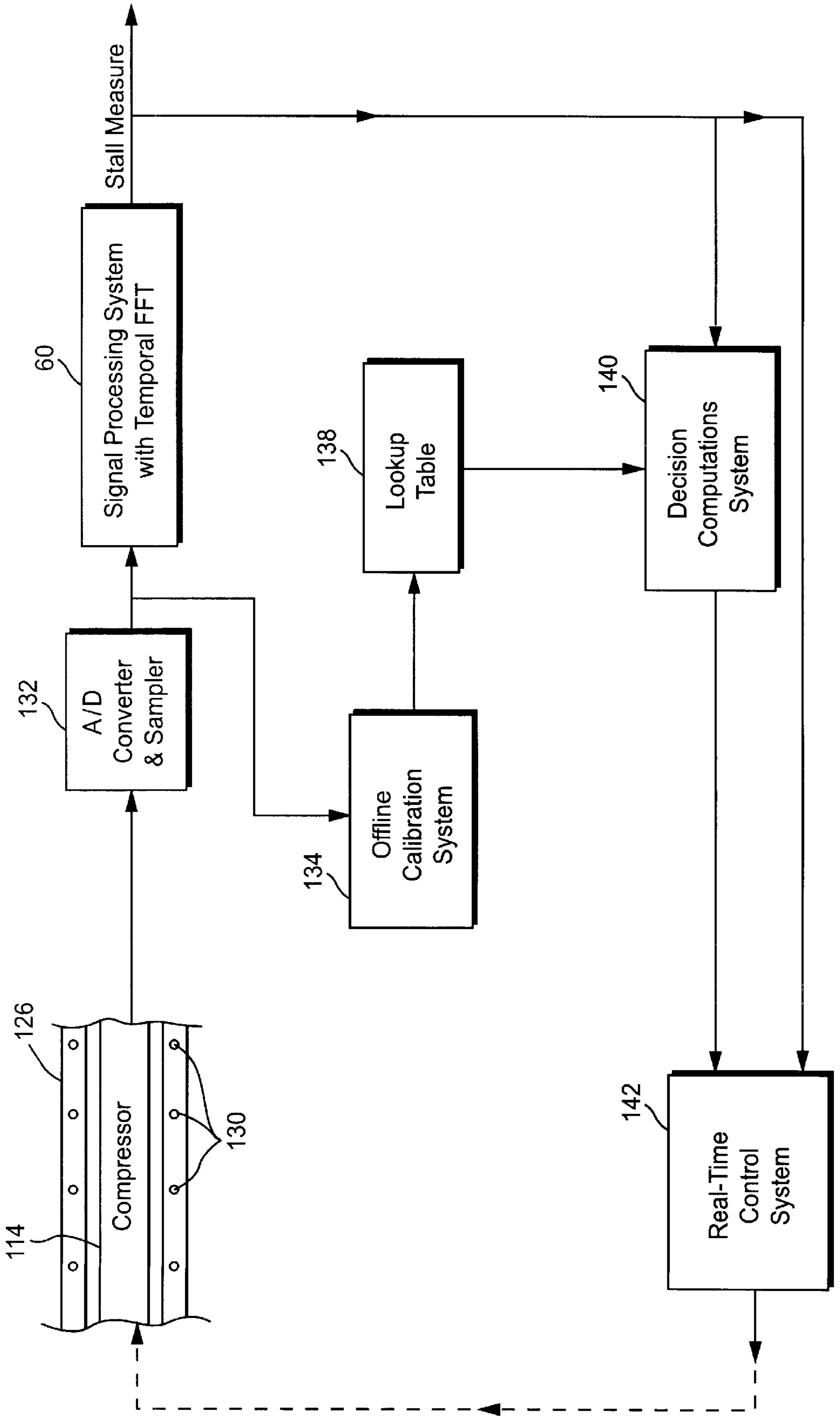
FIG. 4 shows another embodiment of the present invention wherein a temporal FFT is used to compute stall measures.

Referring now to FIG. 4, there is shown another embodiment where elements in common with schematic of FIG. 2 are indicated by similar reference numerals, but with a prefix "1" added. Here, a signal processing system having a temporal Fast Fourier Transform (FFT) algorithm 60 is used for computing stall measures. Compressor data is measured, as a function of time, by sensors disposed about the compressor. A FFT is performed on the measured data and changes in magnitudes at specific frequencies are identified and compared with baseline compressor values to determine compressor health and initiate mitigating actions by control system 142 to maintain a predetermined level of compressor operability.

Figure 5:
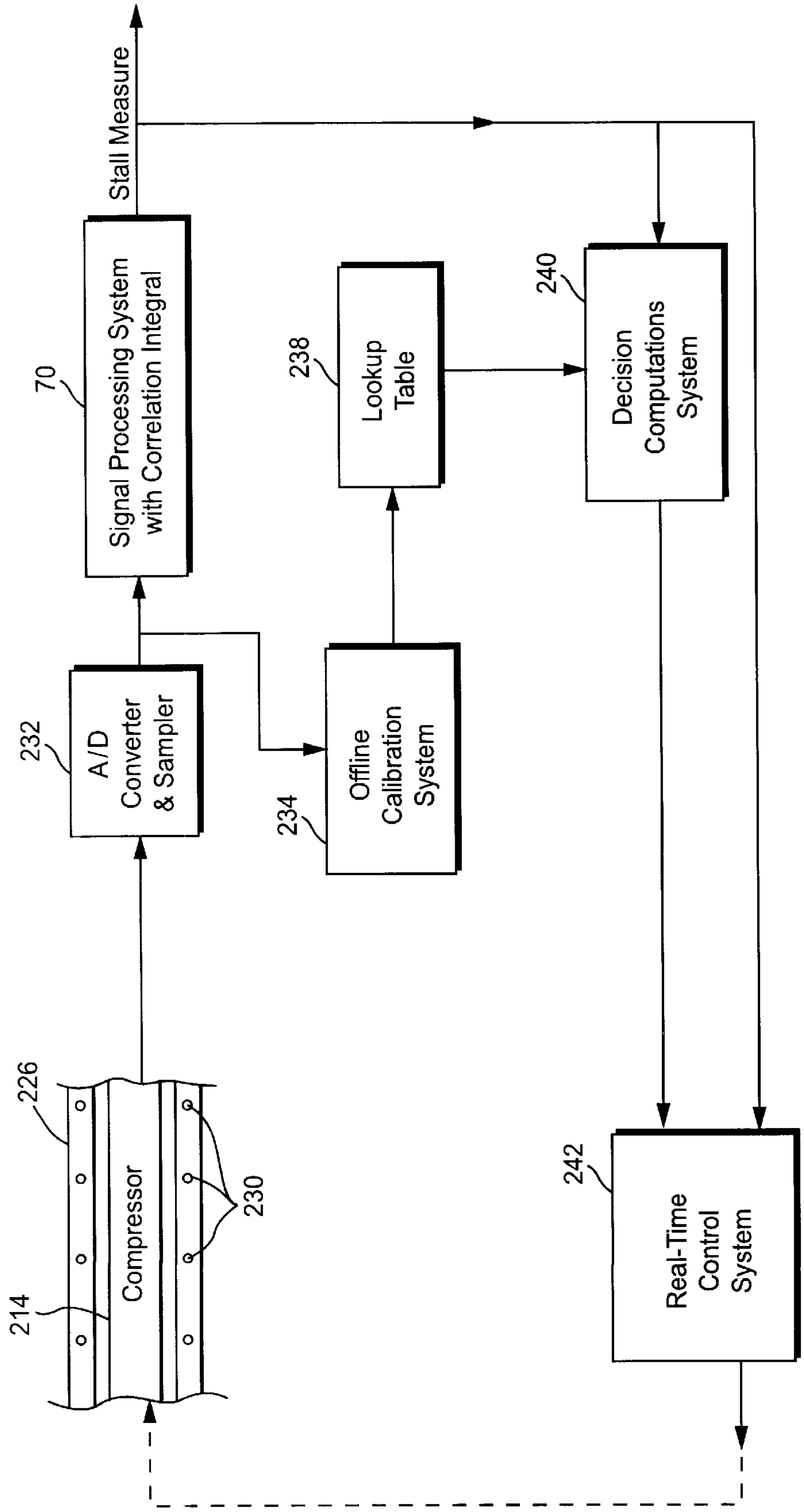
FIG. 5 illustrates another embodiment of the present invention wherein a correlation integral algorithm is used to compute stall measures.

In still another embodiment shown in FIG. 5, a signal processing system 70 having a correlation integral technique in a statistical process context is used to compute stall measures. Here again, for elements in common with the schematic of FIG. 2, similar reference numerals are employed, but with a prefix "2" added. Here, the long-term statistical characteristics of the correlation integral for a healthy compressor is derived and used to obtain a lower control limit. As the correlation integral is computed continuously, the magnitude of the integral is compared at each servo loop to the lower control limit. The compressor of interest is deemed unhealthy if the correlation integral violates any rule in statistical process control when compared to the lower control limit. The correlation integral is computed by the following equation:

$$C(r) = \sum_{i,j=1}^{N} \frac{\text{Number of Times}(|X_i - X_j| > r)}{N^2}$$

where $x_i$=signal x at time instant I

N=total number of samples r=radius of neighborhood

C=correlation integral

Figure 6:
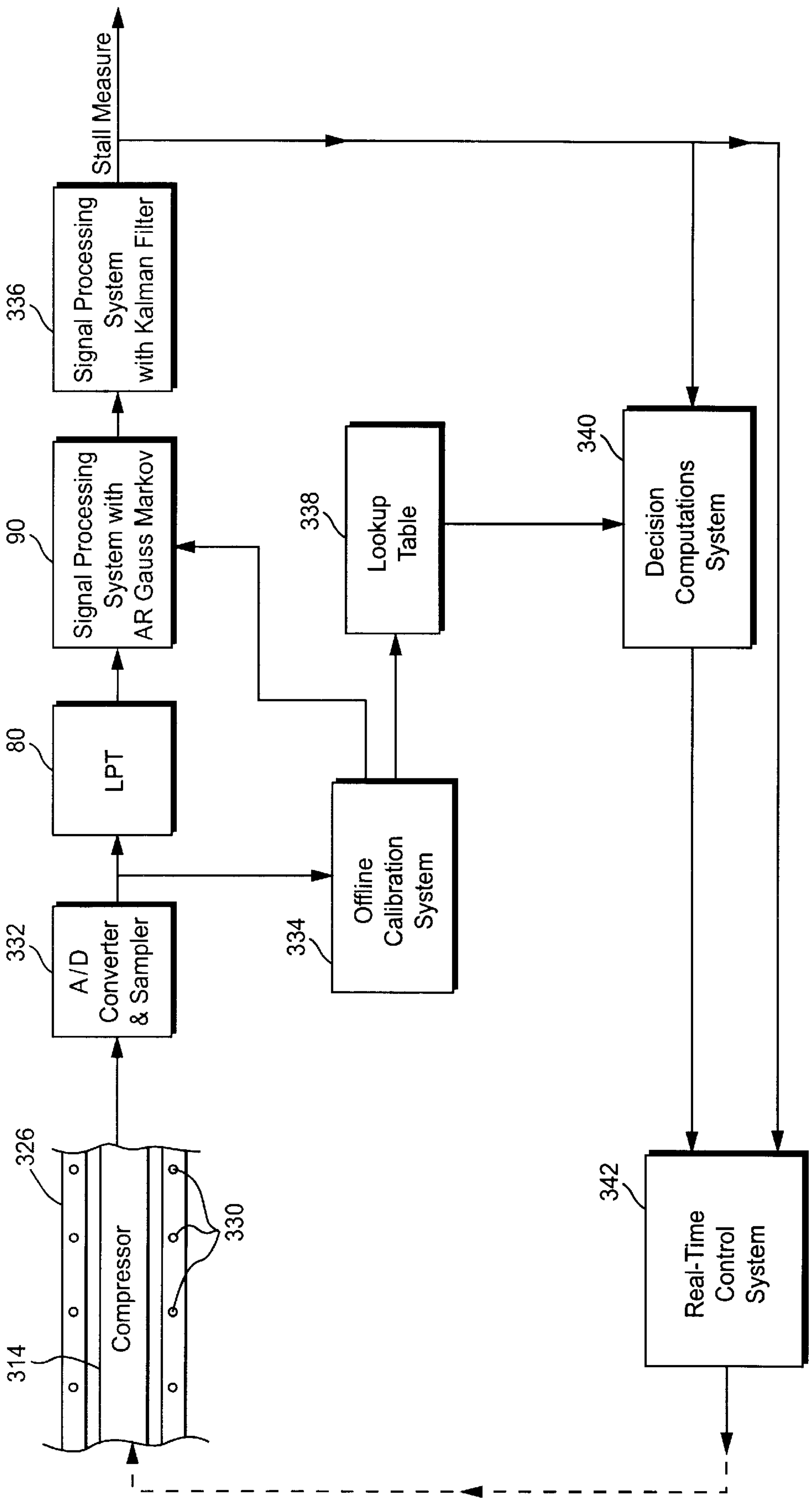
FIG. 6 illustrates another embodiment of the present invention wherein an auto-regression model augmented by a second order Gauss-Markov process is used to estimate stall measures.

In still another embodiment shown in FIG. 6, stall measures are determined using a signal processing system 90 having an auto-regression(AR) model augmented by a second order Gauss-Markov process. Here again, for elements in common with the schematic of FIG. 2, similar reference numerals are employed, but with a prefix "3" added. The AR model is illustrated in state variable form which may be constructed from the offline time-series analysis by offline computations unit 34 (FIG. 2). The AR Gauss Markov model follows the equations:

$$x(n+1)=Ax(n)+Gw(n) \quad (1)$$

$$y(n)=Cx(n)+Hw(n)+v(n) \quad (2)$$

Equation (1) sets forth a relationship between the dynamic state of compressor 14, the plant model 44, and measurement model 46, where x represents a dynamic state; "A" represents the plant model; "G" represents the measurement model; "w", is a noise vector. Equation (2) sets forth a relation between output (y) of compressor 14, the process model "C", and the affect of noise "v" on output, and "H" indicates the effect of sensor noise on the output.

Figure 7:
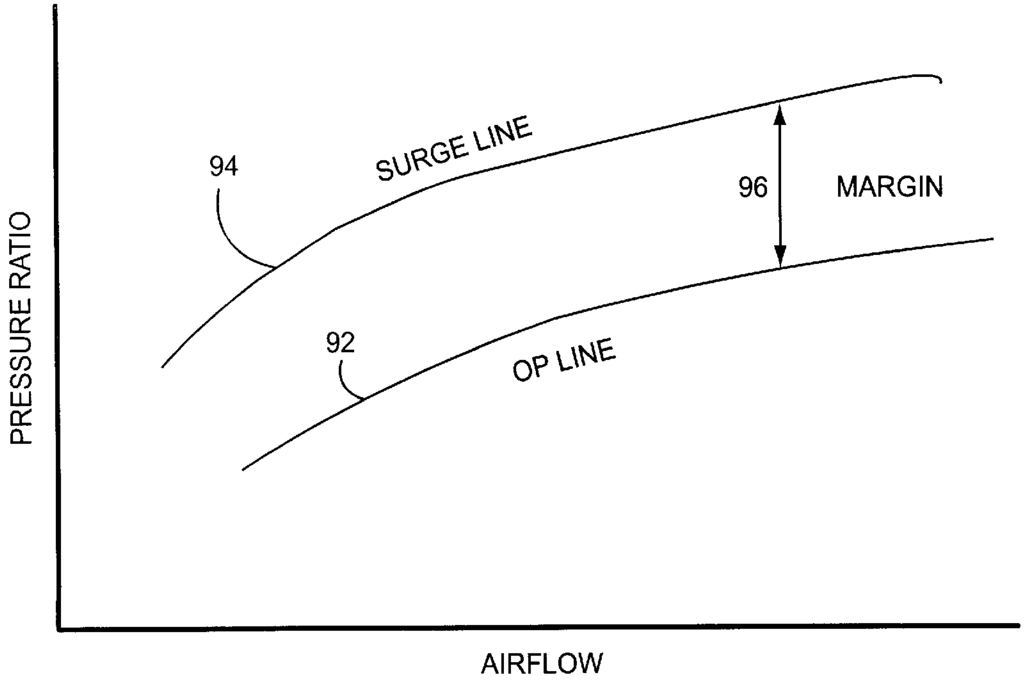
FIG. 7 depicts a graph illustrating pressure ratio on Y-axis and airflow on X-axis for the compressor stage as shown in FIG. 1.

Referring now to FIG. 7, a graph charting pressure ratio on the Y-axis and airflow on the X-axis is illustrated. As previously discussed, the acceleration of a gas turbine engine may result in a compressor stall or surge wherein the pressure ratio of the compressor may initially exceed some critical value, resulting in a subsequent drastic reduction of compressor pressure ratio and airflow delivered to the combustor. If such a condition is undetected and allowed to continue, the combustor temperatures and vibratory stresses induced in the compressor may become sufficiently high to cause damage to the gas turbine. Thus, the corrective actions initiated in response to detection of an onset or precursor to a compressor stall may prevent the problems identified above from taking place. The OPLINE identified at 92 depicts an operating line that the compressor 14 is operating at. As the airflow is increased into the compressor 14, the compressor may be operated at an increased pressure ratio. The margin 96 indicates that once the gas turbine engine 10 operates at values beyond the values set by the OPLINE as illustrated in the graph, a signal indicative of onset of a compressor stall is issued. Corrective measures by the real-time control system 42 may have to be initiated within margin 96 to avoid a compressor surge and near stall operation of the compressor 14.

While the invention has been described in connection with what is presently considered to be the most practical and preferred embodiment, it will be understood that the invention is not to be limited to the disclosed embodiment, but on the contrary, is intended to cover various modifications and equivalent arrangements included within the spirit and scope of the appended claims.

What is claimed is:

1. A method for pro-actively monitoring and controlling a compressor, comprising:

(a) monitoring at least one compressor parameter;

(b) analyzing the monitored parameter to obtain time-series data;

(c) processing the time-series data using a Kalman filter to determine stall precursors;

(d) comparing the stall precursors with predetermined baseline values to identify compressor degradation;

(e) performing corrective actions to mitigate compressor degradation to maintain a pre-selected level of compressor operability; and (f) iterating said corrective action performing step until the monitored compressor parameter lies within predetermined threshold.

2. The method of claim 1 wherein step(c) further comprising:

i. processing the time-series data to compute dynamic model parameters; and ii. combining, in the Kalman filter, the dynamic model parameters and a new measurement of the compressor parameter to produce a filtered estimate.

3. The method of claim 2 further comprising:

iii. computing a standard deviation of difference between the filtered estimate and the new measurement to produce stall precursors.

4. The method of claim 3 wherein said corrective actions are initiated by varying operating line parameters.

5. The method of claim 4 wherein said operating line parameters are set to a near threshold value.

6. The method of claim 3 wherein said corrective actions include reducing the loading on the compressor.

7. An apparatus for monitoring the health of a compressor, comprising:

at least one sensor operatively coupled to the compressor for monitoring at least one compressor parameter;

a processor system, embodying a Kalman filter, operatively coupled to said at least one sensor, said processor system computing stall precursors;

a comparator that compares the stall precursors with predetermined baseline data; and a controller operatively coupled to the comparator, said controller initiating corrective actions to prevent a compressor surge and stall if the stall precursors deviate from the baseline data, said baseline data representing predetermined level of compressor operability.

8. The apparatus of claim 7 further comprises:

an analog-to-digital (A/D) converter operatively coupled to said at least one sensor for sampling and digitizing input data from said at least one sensor;

a calibration system coupled to said A/D converter, said calibration system performing time-series analysis (t,x) on the monitored parameter to compute dynamic model parameters; and a look-up-table (LUT) with memory for storing known sets of compressor data including corresponding stall measure data.

9. The apparatus of claim 7 wherein the corrective actions are initiated by varying operating limit line parameters.

10. The apparatus of claim 9 wherein said operating limit line parameters are set to a near threshold value.

11. In a gas turbine of the type having a compressor, a combustor, a method for monitoring the health of a compressor comprising:

(a) monitoring at least one compressor parameter;

(b) analyzing the monitored parameter to obtain time-series data;

(c) processing the time-series data using a Kalman filter to determine stall precursors;

(d) comparing the stall precursors with predetermined baseline values to identify compressor degradation;

(e) performing corrective actions to mitigate compressor degradation to maintain a pre-selected level of compressor operability; and (f) iterating said corrective action performing step until the monitored compressor parameter lies within predetermined threshold.

12. The method of claim 11 wherein step(c) further comprising:

i. processing the time-series data to compute dynamic model parameters; and ii. combining, in the Kalman filter, the dynamic model parameters and a new measurement of the compressor parameter to produce a filtered estimate.

13. The method of claim 12 further comprising:

iii. computing a standard deviation of difference between the filtered estimate and the new measurement to produce stall precursors.

14. The method of claim 11 wherein the corrective actions are initiated by varying operating line parameters.

15. The method of claim 14 wherein the corrective actions further include varying the loading on the compressor.

16. The method of claim 14, wherein said operating line parameters are set to a near threshold value.

17. An apparatus for monitoring and controlling the health of a compressor, comprising:

means for measuring at least one compressor parameter;

means for computing stall measures;

means for comparing the stall measures with predetermined baseline values; and means for initiating corrective actions if the stall measures deviate from said baseline values.

18. The apparatus of claim 17 wherein said means for computing stall measures embodies a Kalman filter.

19. The apparatus of claim 17 wherein the corrective actions are initiated by varying operating limit line parameters.

20. The apparatus of claim 19 wherein said operating limit line parameters are set to a near threshold value.

21. A method for monitoring and controlling the health of a compressor, comprising:

providing a means for monitoring at least one compressor parameter;

providing a means for computing stall measures;

providing a means for comparing the stall measures with predetermined baseline values; and providing a means for initiating corrective actions if the stall measures deviate from said baseline values.

22. A method of detecting precursors to rotating stall and surge in a compressor, the method comprising measuring the pressure and velocity of gases flowing through the compressor and using a Kalman filter in combination with offline calibration computations to predict future precursors to rotating stall and surge, wherein the Kalman filter utilizes:

a definition of errors and their stochastic behavior in time;

the relationship between the errors and the measured pressure and velocity values; and how the errors influence the prediction of precursors to rotating stall and surge.

23. An apparatus for monitoring the health of a compressor, comprising:

at least one sensor operatively coupled to the compressor for monitoring at least one compressor parameter;

a processor system, embodying a stall precursor detection algorithm, operatively coupled to said at least one sensor, said processor system computing stall precursors;

a comparator that compares the stall precursors with predetermined baseline data; and a controller operatively coupled to the comparator, said controller initiating corrective actions to prevent a compressor surge and stall if the stall precursors deviate from the baseline data, said baseline data representing predetermined level of compressor operability.

24. The apparatus of claim 23 wherein said stall precursor detection algorithm is a Kalman filter.

* * * * *